Patented Oct. 25, 1927.

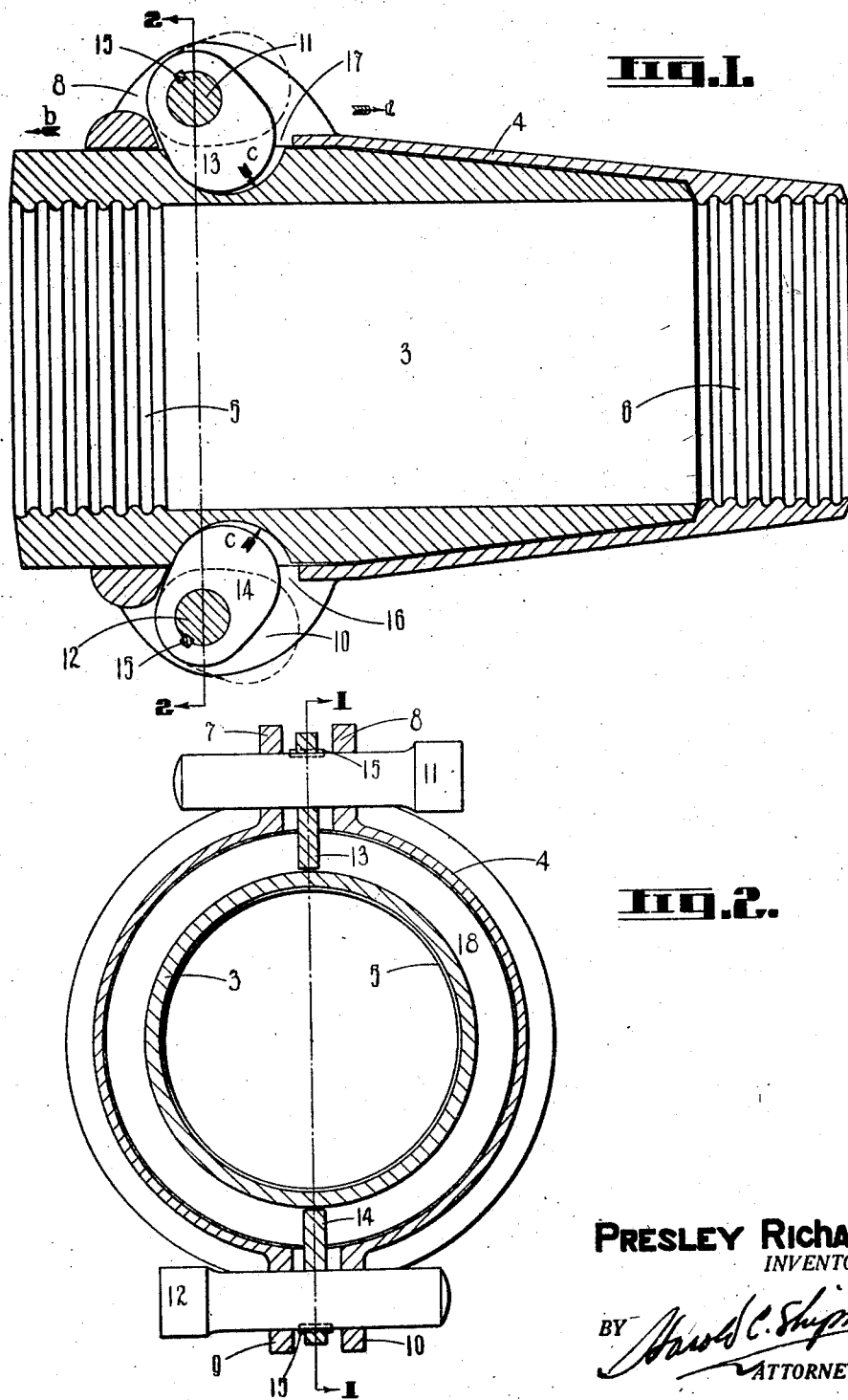

1,646,873

UNITED STATES PATENT OFFICE.

PRESLEY RICHARDS, OF NEWCASTLE, NEW BRUNSWICK, CANADA.

HOSE COUPLING.

Application filed December 21, 1925. Serial No. 76,751.

My present invention appertains generally to improvements in the art of couplings and specifically to a fire hose coupling, as described in the present specification and illustrated in the accompanying drawings.

The invention consists essentially of the novel features pointed out broadly and specifically in the claim for novelty following a description containing an explanation in detail of an acceptable form of the invention.

The primary object of my invention is to provide a fire hose coupling which may be united and disconnected very quickly and which when connected will positively obliterate the possibility of accidental disconnection of the coupled sections when the same are subject to water pressure.

A further effect of my invention is to provide a hose coupling of this character which is very simple in construction, easily and cheap to manufacture, and which will not get out of order easily.

With the foregoing and other objects in view, which will appear more fully as the description proceeds, the invention resides in the novel combination and arrangement of parts hereinafter more specifically set forth, claimed and shown in the accompanying drawings, in which:

Fig. 1 is a vertical longitudinal section of the coupling in assembled relation, the section being taken on the plane designated by the line 1—1 on Fig. 2, and Fig. 2 is a vertical section thereof taken on the plane designated by the line 2—2 on Fig. 1.

Like numerals of reference indicate corresponding parts in both views.

Numerals 3 and 4 designate the male and female sections of the coupling, the ends of which are corrugated as at 5 and 6 to receive the ends of the hose which are clamped therein in any approved manner. Pairs of lugs 7 and 8 and 9 and 10 are formed on the female section 4 on the opposite sides thereof. A bolt 11, carrying a locking cam 13 extends through the pair of lugs 7 and 8 while a corresponding bolt 12 carrying a lock cam 14 extends through the pair of lugs 9 and 10. These locking cams 13 and 14 are positioned between said lugs, are secured to said bolts by means of keys 15, and extend through openings 16 and 17 in said female section so that the lower extremities thereof seat in the annular groove 18 formed in the male section 3 of the coupling.

To assemble the coupling, the bolts 11 and 12 are turned so that the locking cams 13 and 14 are clear of the outer face of the female section 4, as shown in dotted position. The male section 3 is then inserted in the female section 4, and the cams are turned downwardly to the position shown in full lines in Fig. 1 so that the ends thereof seat in the annular groove 18. When in this position, the water flowing through the coupling, tending to separate the same, forces the sections in the opposite direction as indicated by the arrows $a$ and $b$, and binds the locking cams against the annular groove 18 as at $c$. The cam action effected positively obliterates the possibility of the sections accidentally becoming disconnected in the ordinary use of the fire hose, yet when the pressure is relieved the locking cams 13 and 14, by means of the bolts 11 and 12, can be released from their locked position by means of a wrench or tool with expediency and facility.

Minor changes may be resorted to in the details of my invention in its commercial adaptation, but

What I claim as new is:

A hose coupling consisting of a female section; a male section adapted to be snugly fitted into said female section; an annular groove on the outer circumference of said male section near the protruding end thereof; cam members pivotally carried by said female section, the cam portion of each of said cam members being adapted to swing through longitudinal openings in said female section and engage in said groove.

In testimony whereof, I affix my signature.

PRESLEY RICHARDS.